(12) United States Patent
Wang et al.

(10) Patent No.: US 9,088,800 B2
(45) Date of Patent: *Jul. 21, 2015

(54) GENERAL VIDEO DECODING DEVICE FOR DECODING MULTILAYER VIDEO AND METHODS FOR USE THEREWITH

(75) Inventors: Limin (Bob) Wang, Richmond Hill (CA); Zhong Yan (Jason) Wang, Markham (CA); Yinxia (Michael) Yang, Richmond Hill (CA); Xin (Cindy) Guo, Toronto (CA); Xiangiun (Maggie) Zhang, Richmond Hill (CA)

(73) Assignee: VIXS Systems, INC, Toronto, Ontario (CA)

( * ) Notice: Subject to any disclaimer, the term of this patent is extended or adjusted under 35 U.S.C. 154(b) by 777 days.

This patent is subject to a terminal disclaimer.

(21) Appl. No.: 13/042,184

(22) Filed: Mar. 7, 2011

(65) Prior Publication Data

US 2012/0224625 A1 Sep. 6, 2012

Related U.S. Application Data

(60) Provisional application No. 61/449,461, filed on Mar. 4, 2011.

(51) Int. Cl.
*H04N 7/26* (2006.01)
*H04N 11/02* (2006.01)
*H04N 11/04* (2006.01)
(Continued)

(52) U.S. Cl.
CPC ............. *H04N 19/59* (2014.11); *H04N 19/187* (2014.11); *H04N 19/30* (2014.11); *H04N 19/82* (2014.11); *H04N 19/117* (2014.11); *H04N 19/139* (2014.11); *H04N 19/176* (2014.11); *H04N 19/436* (2014.11); *H04N 19/86* (2014.11)

(58) Field of Classification Search
None
See application file for complete search history.

(56) References Cited

U.S. PATENT DOCUMENTS

2007/0291858 A1* 12/2007 Hussain et al. .......... 375/240.29
2008/0165848 A1* 7/2008 Ye et al. .................. 375/240.13
(Continued)

FOREIGN PATENT DOCUMENTS

EP      1351512 A2   10/2003
EP      1507416 A1    2/2005
(Continued)

OTHER PUBLICATIONS

JVT: Joint Scalable Video Model JSVM-4; Joint Video Team (JVT) of ISO/IEC MPEG & ITU-T VCEG (ISO/IEC JTC1/SC29/WG11 and ITU-T-SG16 Q.6; 17th Meeting: Nice, FR; Oct. 2005; 42 pgs.
(Continued)

*Primary Examiner* — Joseph G. Ustaris
*Assistant Examiner* — William Adrovel
(74) *Attorney, Agent, or Firm* — Garlick & Markison; Bruce E. Stuckman

(57) ABSTRACT

A video decoder includes an entropy decoding device that includes a first processor that generates entropy decoded (EDC) data from an encoded video signal that includes a plurality of video layers. A general video decoding device includes a second processor that generates a decoded video signal from the EDC data, wherein the general video decoding device includes a neighbor management module, a decode motion compensation module, an inverse intra-prediction module, an inverse transform/quantization module, a deblocking filter module, and a resampling module.

14 Claims, 13 Drawing Sheets

(51) Int. Cl.
*H04N 7/12* (2006.01)
*G06K 9/36* (2006.01)
*H04N 19/59* (2014.01)
*H04N 19/30* (2014.01)
*H04N 19/187* (2014.01)
*H04N 19/82* (2014.01)
*H04N 19/436* (2014.01)
*H04N 19/139* (2014.01)
*H04N 19/86* (2014.01)
*H04N 19/176* (2014.01)
*H04N 19/117* (2014.01)

(56) References Cited

U.S. PATENT DOCUMENTS

2008/0199090 A1 8/2008 Tasaka et al.
2010/0260260 A1* 10/2010 Wiegand et al. ......... 375/240.12
2011/0080957 A1 4/2011 Pan et al.

FOREIGN PATENT DOCUMENTS

| EP | 1615446 | A2 | 1/2006 |
|---|---|---|---|
| WO | 03/047260 | A2 | 6/2003 |
| WO | 2005/057935 | A2 | 6/2005 |
| WO | 2005081532 | A1 | 9/2005 |
| WO | 2007/040369 | A1 | 4/2007 |
| WO | 2009/003499 | A1 | 1/2009 |
| WO | 2011/094047 | A1 | 8/2011 |

OTHER PUBLICATIONS

Wiegand; Scalable Video Coding for IPTV Services; IEEE Transactions on Broadcasting; vol. 55, No. 2; Jun. 2009; 12 pgs.
Extended European Search Report; EP Application No. 12158128.4; Sep. 19, 2012; 13 pages.
Extended European Search Report; EP Application No. 12158127.6; May 31, 2012; 13 pages.
Peter List et al., "Adaptive Deblocking Filter," IEEE Transactions on Circuits and Systems for Video Technology, vol. 13, No. 7, Jul. 2003.
P.H.N. De With, "On the Design of a Multimedia Software and Future System Architectures," Proceedings of SPIE-IS&T Electronic Imaging, SPIE vol. 5309, 2004, pp. 58-67, LogicaCMG/Eindhoven University of Technology, the Netherlands.
Segall, C. Andrew, "Spatial Scalability Within the H.264/AVC Scalable Video Coding Extension," IEEE Transactions on Circuits and Systems for Video Technology, vol. 17, No. 9, Sep. 2007.
Wang, Yanlai, "Adaptive Video Coding in Loop Filter Based on Content," IEEE Int. Conf. Neural Networks & Signal Processing, Nanjing, China, Dec. 14-17, 2003.

* cited by examiner

GENERAL VIDEO DECODING DEVICE FOR DECODING MULTILAYER VIDEO AND METHODS FOR USE THEREWITH

CROSS REFERENCE TO RELATED PATENTS

The present U.S. Utility Patent Application claims priority pursuant to 35 USC 119(e) to the provisionally filed application entitled, "VIDEO DECODER WITH GENERAL VIDEO DECODING DEVICE AND METHODS FOR USE THEREWITH," having U.S. Utility Patent Application Ser. No. 61/449,461, filed on Mar. 4, 2011, which is hereby incorporated herein by reference in its entirety and made part of the present U.S. Utility Patent Application for all purposes.

TECHNICAL FIELD OF THE INVENTION

The present invention relates to coding used in devices such as video decoders for video signals.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. The video signal encoded by these encoding methods must be similarly decoded for playback on most video display devices.

The Motion Picture Expert Group (MPEG) has presented a Scalable Video Coding (SVC) Annex G extension to H.264/MPEG-4 AVC for standardization. SVC provides for encoding of video bitstreams that include subset bitstreams that can represent lower spatial resolution, lower temporal resolution or otherwise lower quality video. A subset bitstream can be derived by dropping packets from the total bitstream. SVC streams allow end devices to flexibly scale the temporal resolution, spatial resolution or video fidelity, for example, to match the capabilities of a particular device.

Efficient and fast encoding and decoding of video signals is important to the implementation of many video devices, particularly video devices that are destined for home use. Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
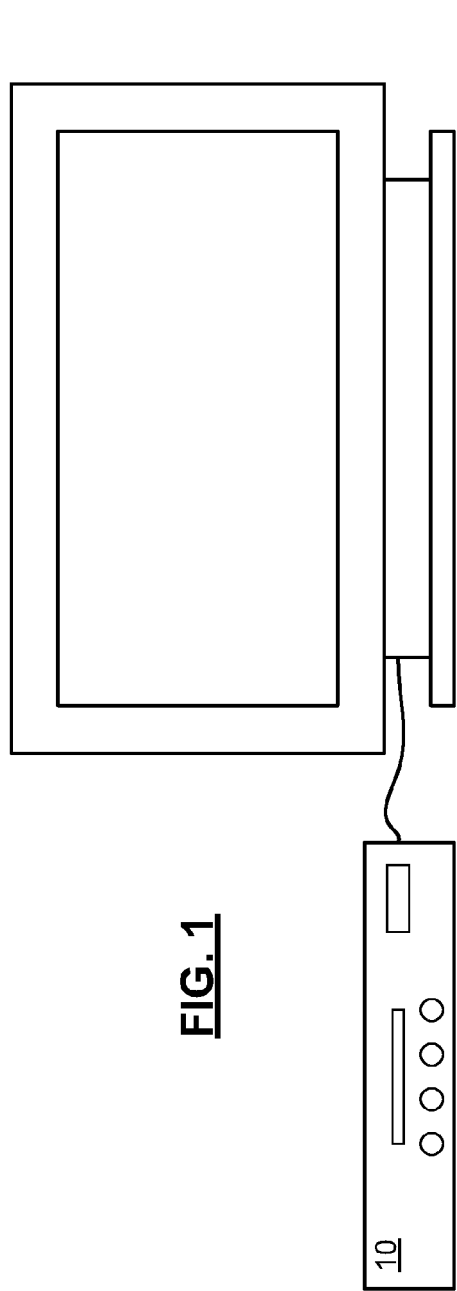
FIGS. 1-3 present pictorial diagram representations of various video devices in accordance with embodiments of the present invention.
Figure 2:
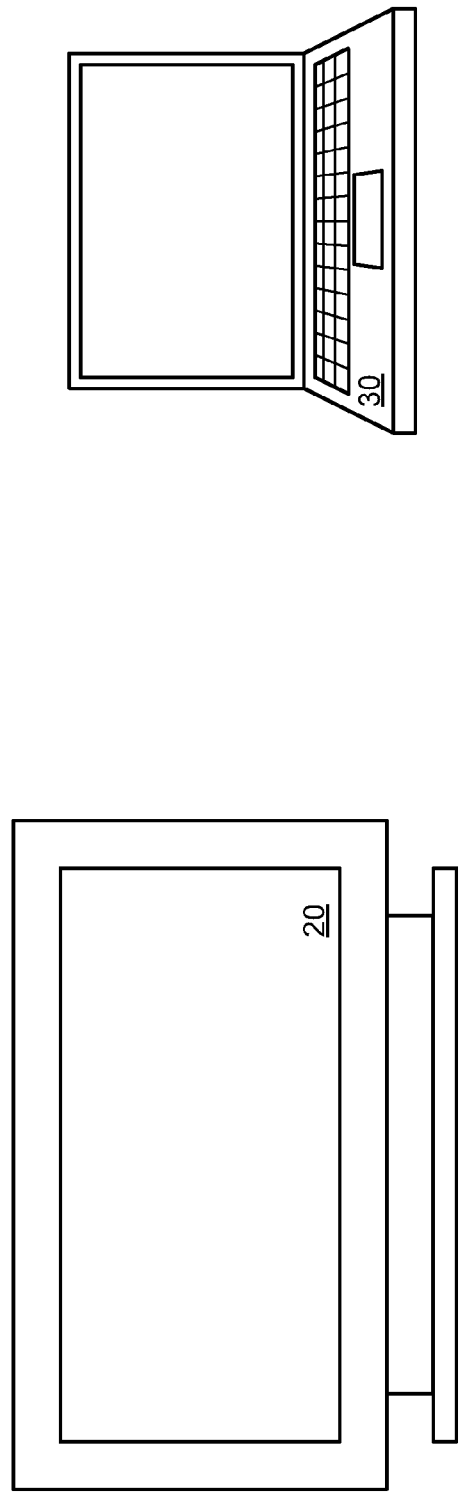
Figure 3:
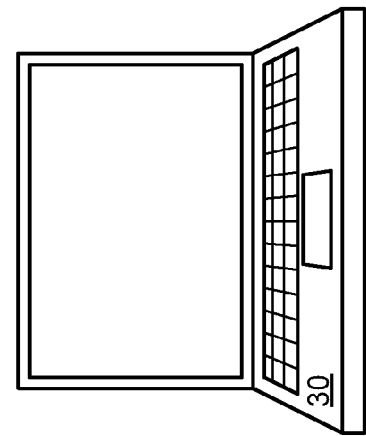

FIGS. 1-3 present pictorial diagram representations of various video devices in accordance with embodiments of the present invention. In particular, set top box 10 with built-in digital video recorder functionality or a stand alone digital video recorder, television or monitor 20 and portable computer 30 illustrate electronic devices that incorporate a video decoder in accordance with one or more features or functions of the present invention. While these particular devices are illustrated, the present invention can be implemented in any device that is capable of decoding and/or transcoding video content in accordance with the methods and systems described in conjunction with FIGS. 4-18 and the appended claims.

Figure 4:
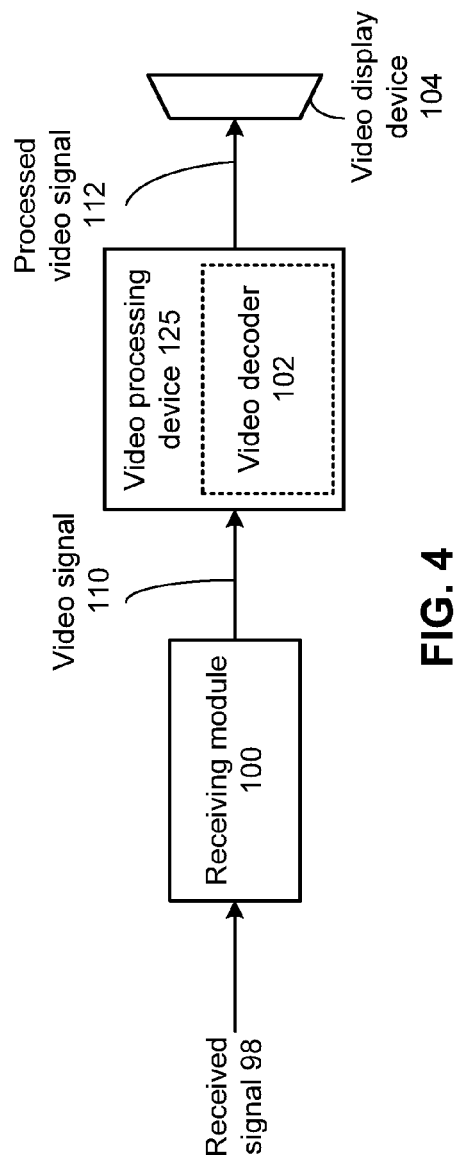
FIG. 4 presents a block diagram representation of a video system in accordance with an embodiment of the present invention.

FIG. 4 presents a block diagram representation of a video decoder 102 in accordance with an embodiment of the present invention. In particular, this video device includes a receiving module 100, such as a server, cable head end, television receiver, cable television receiver, satellite broadcast receiver, broadband modem, 3G transceiver or other information receiver or transceiver that is capable of receiving a received signal 98 and generating a video signal 110 that has been encoded via a video encoding format. Video processing device 125 includes video decoder 102 and is coupled to the receiving module 100 to decode or transcode the video signal for storage, editing, and/or playback in a format corresponding to video display device 104. Video processing device can include set top box 10 with built-in digital video recorder functionality or a stand alone digital video recorder. While shown as a separate from video display device 104, video processing device 125, including video decoder 102 can be incorporated in television or monitor 20 and portable computer 30 of other device that includes a video decoder, such as video decoder 102.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include a digital video signal complying with a digital video codec standard such as H.264, MPEG-4 Part 10 Advanced Video Coding (AVC) including a SVC signal, an encoded stereoscopic video signal having a base layer that includes a 2D compatible base layer and an enhancement layer generated by processing in accordance with an MVC extension of MPEG-4 AVC, or another digital format such as a Motion Picture Experts Group (MPEG) format (such as MPEG1, MPEG2 or MPEG4), Quicktime format, Real Media format, Windows Media Video (WMV) or Audio Video Interleave (AVI), video coding one (VC-1), etc.

Video display devices 104 can include a television, monitor, computer, handheld device or other video display device that creates an optical image stream either directly or indirectly, such as by projection, based on the processed video signal 112 either as a streaming video signal or by playback of a stored digital video file.

Figure 5:
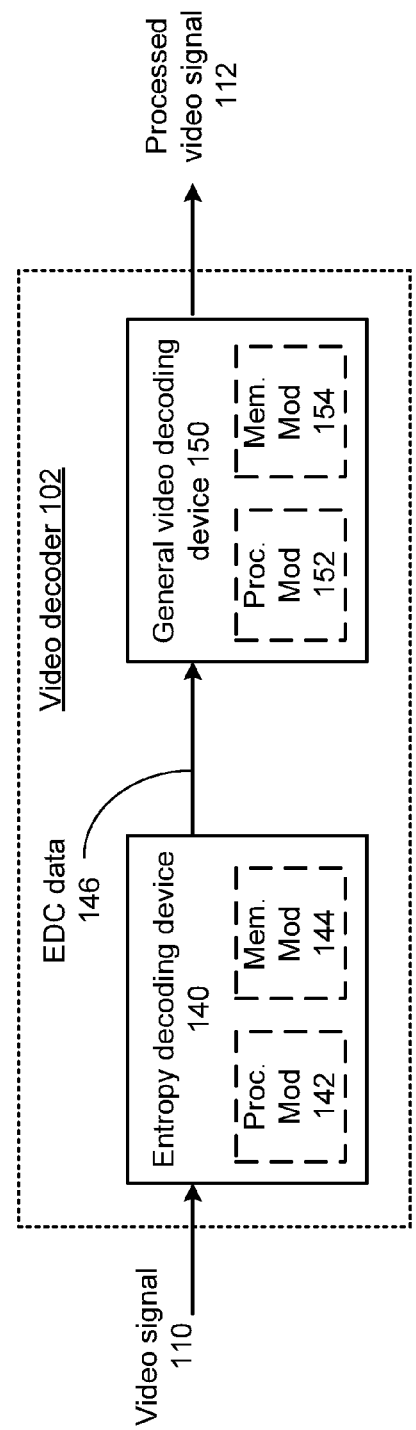
FIG. 5 presents a block diagram representation of a video decoder 102 in accordance with an embodiment of the present invention.

FIG. 5 presents a block diagram representation of a video decoder 102 in accordance with an embodiment of the present invention. Video decoder 102 includes an entropy decoding device 140 having a processing module 142 that generates entropy decoded (EDC) data 146 from an encoded video signal such as video signal 110. General video decoding device 150 includes a processing module 152 that generates a decoded video signal, such as processed video signal 112, from the EDC data 146. The EDC data 146 can include run length data, motion vector differential data, and macroblock header data and/or other data that results from the entropy decoding of an encoded video signal. In particular, the encoded video signal can include a plurality of video layers, such as an MVC stereoscopic signal, an SVC signal or other multi-layer video signal and the EDC data 146 can include slice header data corresponding to at least one of the plurality of video layers.

In an embodiment of the present invention, the entropy decoding device 140 and the general video decoding device 150 operate contemporaneously in a pipelined process where the general video decoding device 150 generates a first portion of the decoded video signal during at least a portion of time that the entropy decoding device 140 generates EDC data 146 from a second portion of the encoded video signal.

The processing modules 142 and 152 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory modules 144 and 154. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing modules 142 and 152 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 6:
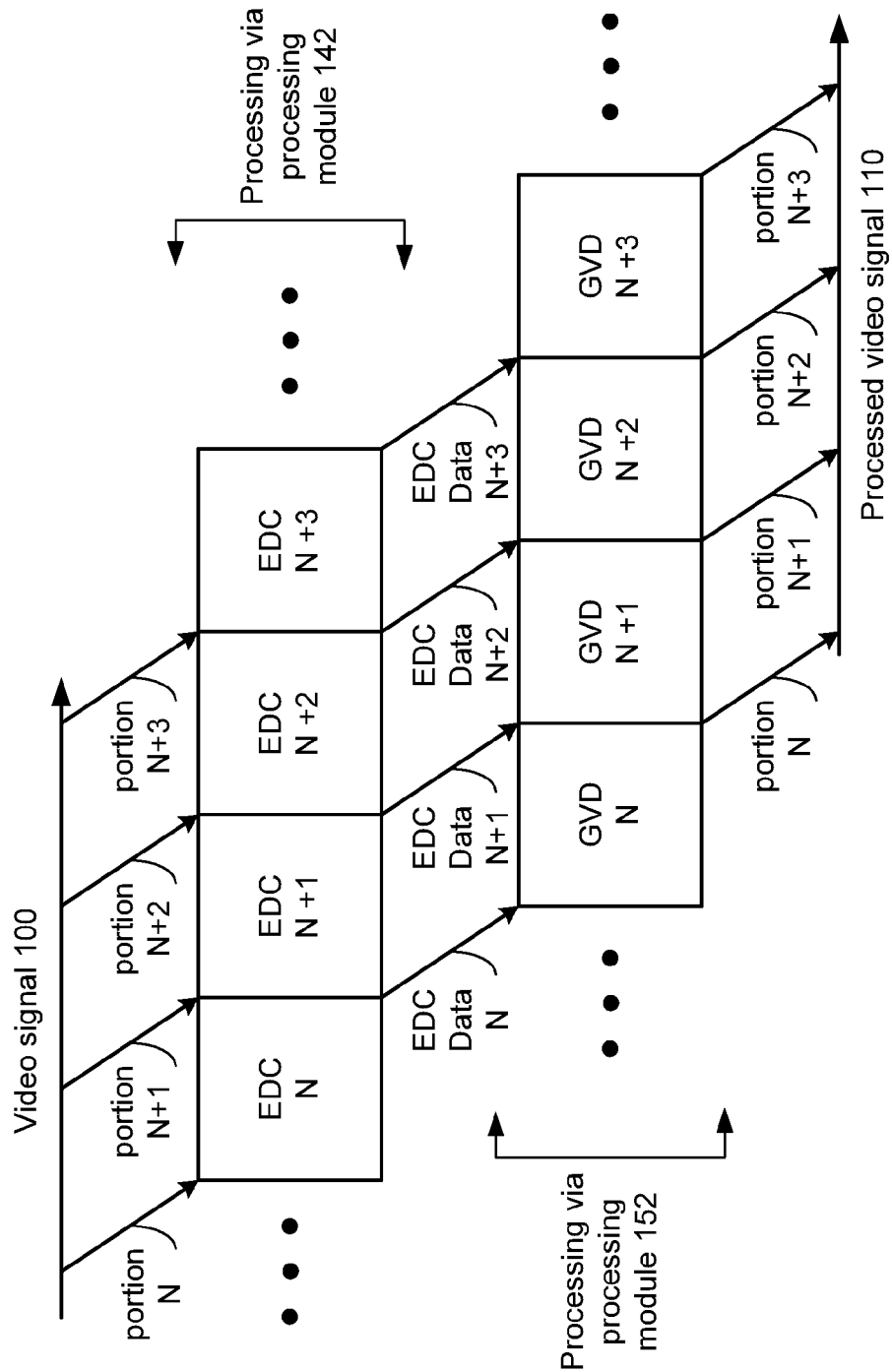
FIG. 6 presents a block diagram representation of a pipeline processing of video signals in accordance with an embodiment of the present invention.

FIG. 6 presents a block diagram representation of a pipeline processing of video signals in accordance with an embodiment of the present invention. Time progresses from left to right. EDC processing via processor 142 is presented in a first row where successive portions of the encoded video signal [N, N+1, N+2, N+3, . . . ] are processed in sequence during processing periods [EDC N, EDC N+1, EDC N+2, EDC N+3, . . . ]. Further, general video decoder (GVD) processing via processing module 152 is shown in a second row. Successive portions of the EDC data 146 [EDC data N, EDC data N+1, EDC data N+2, EDC data N+3, . . . ] are processed in sequence during processing periods [GVD N, GVD N+1, GVD N+2, GVD N+3, . . . ].

In operation, processing module 142 generates entropy decoded (EDC) data N from the Nth portion of an encoded video signal, during processing time EDC N. Similarly and in sequence, processing module 142 generates entropy decoded EDC data N+1, EDC data N+2, EDC data N+3 from the portions N+1, N+2, N+3 of an encoded video signal, during processing times EDC N+1, EDC N+2, and EDC N+3, respectively. Processing module 152 processes the entropy decoded (EDC) data N into the Nth portion of decoded video signal, during processing time GVD N. Similarly and in sequence, processing module 152 processes entropy decoded EDC data N+1, EDC data N+2, EDC data N+3 into portions N+1, N+2, N+3 of the decoded video signal, during processing times GVD N+1, GVD N+2, and GVD N+3, respectively.

As shown, the EDC processing (syntax decoding) and GVD processing (non-syntax related coding) are performed contemporaneously, in parallel, and in a pipelined fashion. In particular, the Nth portion of the decoded video signal is processed from the Nth EDC data contemporaneously by the GVD device 150 during at least a portion of time that the EDC device 140 generates the N+1 EDC data from the N+1 portion of the encoded video signal.

In an embodiment of the present invention, the portions of video signals 110 and processed video signal and 112 are pictures (frames/fields) of the video signals, however, larger portions, such as a group of pictures or smaller portions such as macroblocks or groups of macroblocks or other portion sizes could likewise be employed.

Figure 7:
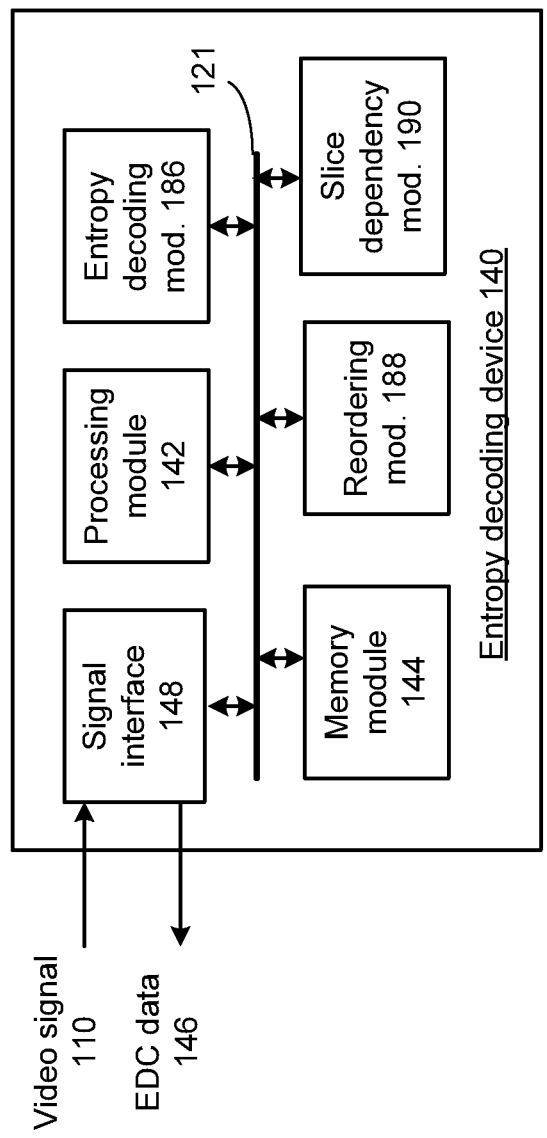
FIG. 7 presents a block diagram representation of an entropy decoding device 140 in accordance with an embodiment of the present invention.

FIG. 7 presents a block diagram representation of an entropy decoding device 140 in accordance with an embodiment of the present invention. In particular, entropy decoding device 140 includes a processing module 142 and a memory module 144 as described in conjunction with FIG. 5. In addition, the entropy decoding device 140 further includes a bus 121, a signal interface 148, entropy decoding module 186, reordering module 188 and optional slice dependency module 190. In operation, the signal interface 148 receives video signal 110 and optionally buffers and preprocesses the video signal for processing by the other modules of entropy decoding device 140. Similarly, the EDC data generated via processing by the other modules of entropy decoding device 140 is optionally buffered, such as via a ring buffer or other buffer structure implemented in conjunction with memory locations of memory module 144 and formatted for output as EDC data 146 to interface with general video decoder 150.

The entropy decoding module 186 and reordering module 188 operate to perform arithmetic decoding, context adaptive binary arithmetic coding (CABAC) decoding, huffman decoding, run length decoding and/or other entropy decoding an reordering of the encoded video signal into EDC data 146 such as run length data, motion vector differential data, and macroblock header data and/or other data that results from the entropy decoding of an encoded video signal.

In an embodiment of the present invention, the entropy decoding module 186, reordering module 188 and slice dependency module 190 are implemented using software stored in memory module 144 and executed via processing module 142. In alternative embodiments the entropy decoding module 186, reordering module 188 and slice dependency module 190 are optionally implemented via other hardware, software or firmware. Thus, while a particular bus architecture is shown that represents the functionally of communication between the various modules of entropy decoding device 140, other architectures can be implemented in accordance with the broad scope of the present invention.

As discussed in conjunction with FIG. 5, the encoded video signal can include a plurality of video layers, such as an MVC stereoscopic signal, an SVC signal or other multi-layer video signal and the EDC data 146 can include slice header data corresponding to at least one of the plurality of video layers.

Figure 8:
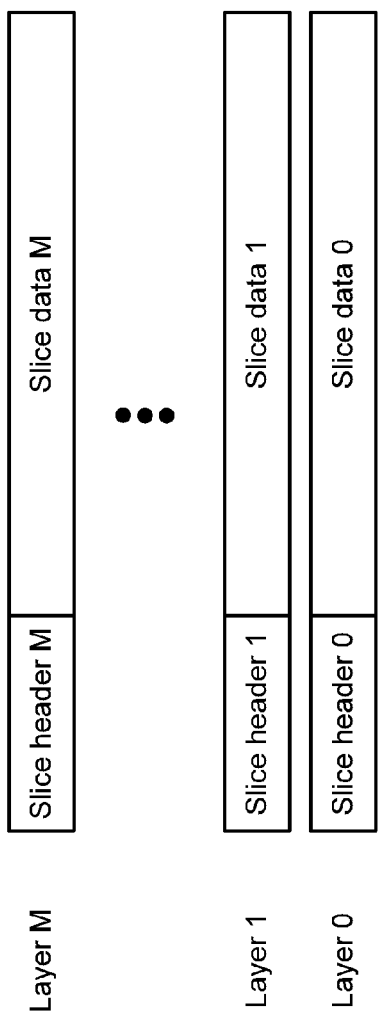
FIG. 8 presents a block diagram representation of a plurality of video layers in accordance with an embodiment of the present invention.

FIG. 8 presents a block diagram representation of a plurality of M video layers of an encoded video signal, such as video signal 110, in accordance with an embodiment of the present invention.

Optional slice dependency module 190 operates on these video layers to generate slice dependency data. This slice dependency data is used by the processing module 142 to control the entropy decoding of a selected subset of the plurality of video layers, based on the slice dependency data. In an embodiment of the present invention, the slice dependency module 190 operates to decode the slice headers of each of the video layers before the slice data is entropy decoded. The slice dependency module 190 extracts dependency data from a slice header for each of the plurality of video layers that indicates the dependency of each layer. This dependency data includes, for example, an indication of the video layers that each video layer is directly dependent on as well as video layers that each layer is indirectly dependent on.

Consider an example with where M=4, and the direct dependencies of each video layer are expressed in conjunction with the following dependency data derived each layers dependency quality identification data (DQ ID):
  Layer 4, (dependent on Layer 3)
  Layer 3, (dependent on Layer 1)
  Layer 2, (dependent on Layer 1)
  Layer 1, (no dependencies)

The slice dependency module 190 extracts each layers DQ ID and generates the following slice dependency data from that indicates both direct and indirect dependencies by following the chain of dependencies from each layer:
  Layer 4, (dependent on Layers 3, 1)
  Layer 3, (dependent on Layer 1)
  Layer 2, (dependent on Layer 1)
  Layer 1, (no dependencies)

When the decoder 102 is decoding a target layer, the slice dependency data can be used to generate a selected subset of the video layers required to decode the target layer. Following with the example above, if the target layer is layer 4, a subset of the layers that includes only layers 4, 3 and 1 need only be EDC and GVD decoded. Because layer 4 is not dependent on layer 2, either directly or directly, this layer can be excluded from the selected subset of layers and need not be EDC or GVD decoded. In another example, where layer 2 is the target layer, a subset of the layers that includes only layers 2 and 1 need be EDC and GVD decoded. Layers 4 and 3 can be excluded from the selected subset of layers and need not be EDC or GVD decoded.

It should also be noted that the slice dependency data generated by slice dependency module 190 indicates an ordering of the layer decoding. In particular, the layers are decoded in reverse order of their dependency. In the example above, where the target layer 4 is selected, the layers are EDC and GVD decoded in the order 1-3-4. Similarly, where the target layer 2 is selected, the layers are EDC and GVD decoded in the order 1-2. This saves memory space and decoding time of the layers that are not necessary to the final decoded video signal.

Figure 9:
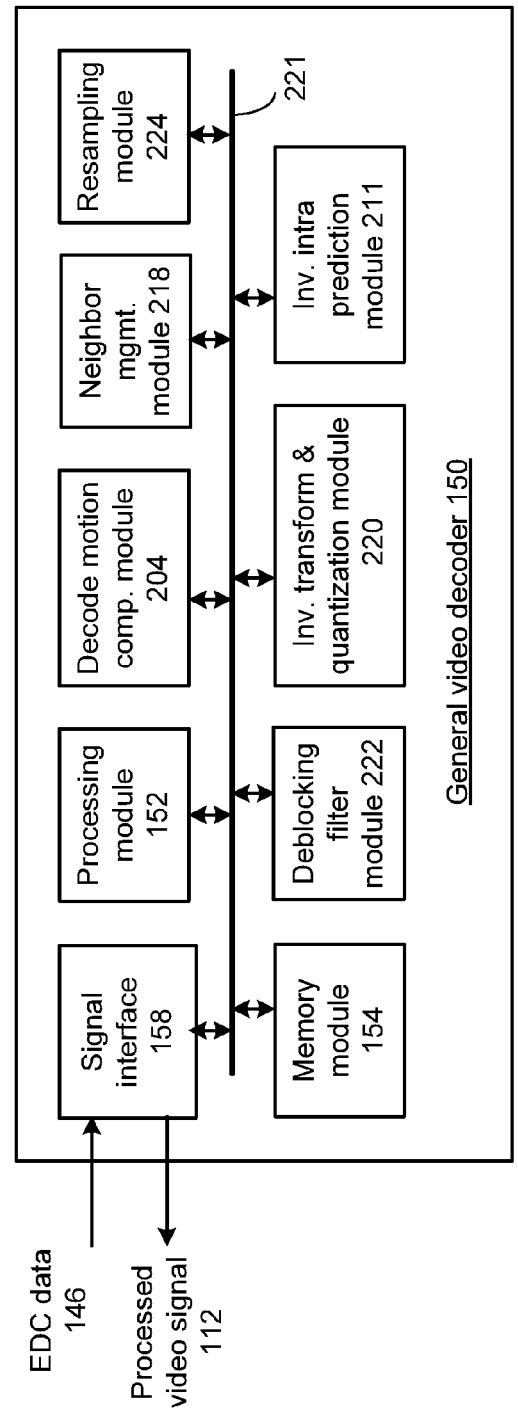
FIG. 9 presents a block diagram representation of a general video decoder 150 in accordance with an embodiment of the present invention.

FIG. 9 presents a block diagram representation of a general video decoder 150 in accordance with an embodiment of the present invention. In particular, general video decoding device 150 includes a processing module 152 and a memory module 154 as described in conjunction with FIG. 5. In addition, the general video decoding device 150 further includes a bus 221, a signal interface 158, decode motion compensation module 204, neighbor management module 218, deblocking filter module 222, inverse transform and quantization module 220, inverse intra prediction module 211 and optional resampling module 224. In operation, the signal interface 158 receives EDC data 146 and optionally buffers and preprocesses the EDC data 146 for processing by the other modules of general video decoding device 150. Similarly, the decoded video signal generated via processing by the other modules of general video decoding device 150 is optionally buffered, such as via a ring buffer or other buffer structure implemented in conjunction with memory locations of memory module 154 and formatted for output as processed video signal 112.

The decode motion compensation module 204, neighbor management module 218, deblocking filter module 222, inverse transform and quantization module 220, inverse intra prediction module 211 and optional resampling module 224 operate to decode the EDC data 146 in accordance with a video standard such as H.264 (including MVC and/or SVC), VC-1 or other compression standard. In an embodiment of the present invention, the decode motion compensation module 204, neighbor management module 218, deblocking filter module 222, inverse transform and quantization module 220, inverse intra prediction module 211 and optional resampling module 224 are implemented using software stored in memory module 154 and executed via processing module 152. In alternative embodiments the decode motion compensation module 204, neighbor management module 218, deblocking filter module 222, inverse transform and quantization module 220, inverse intra prediction module 211 and optional resampling module 224 are optionally implemented via other hardware, software or firmware. Thus, while a particular bus architecture is shown that represents the functionally of communication between the various modules of general video decoding device 150, other architectures can be implemented in accordance with the broad scope of the present invention.

In operation, neighbor management module 218 generates motion vector data, macroblock mode data and deblock strength data, based on the motion vector differential data and the macroblock header data. In an embodiment of the present invention, a data structure, such as a linked list, array or one or more registers are used to associate and store neighbor data for each macroblock of a processed picture. In particular, the neighbor management module 218 stores the motion vector data for a group of macroblocks that neighbor a current macroblock and generates the motion vector data for the current macroblock based on both the macroblock mode data and the motion vector data for the group of macroblocks that neighbor the current macroblock. In addition, the neighbor management module calculates a motion vector magnitude and adjusts the deblock strength data based on the motion vector magnitude.

The decode motion compensation module generates inter-prediction data based on the motion vector data when the macroblock mode data indicates an inter-prediction mode. The inverse intra-prediction module 211, generates intra-prediction data when the macroblock mode data indicates an intra-prediction mode. The inverse transform/quantization module 220 generates reconstructed picture data based on the run length data and on the inter-prediction data when the macroblock mode data indicates an inter-prediction mode and based on the run length data and on the intra-prediction data when the macroblock mode data indicates an intra-prediction mode.

The deblocking filter module 222 generates the decoded video signal from the reconstructed picture data, based on the deblock strength data. In operation, the deblocking filter 222 operates to smooth horizontal and vertical edges of a block that may correspond to exterior boundaries of a macroblock of a frame or field of video signal 110 or edges that occur in the interior of a macroblock. A boundary strength, that is determined based on quantization parameters, adjacent macroblock type, etcetera, can vary the amount of filtering to be performed. In addition, the H.264 standard defines two parameters, $\alpha$ and $\beta$, that are used to determine the strength of filtering on a particular edge. The parameter $\alpha$ is a boundary edge parameter applied to data that includes macroblock boundaries. The parameter $\beta$ is an interior edge parameter applied to data that within a macroblock interior.

According to the H.264 standard, $\alpha$ and $\beta$ are selected as integers within the range $[-6, 6]$ based on the average of the quantization parameters, QP, of the two blocks adjacent to the edge. In particular, $\alpha$ and $\beta$ are increased for large values of QP and decreased for smaller values of QP. In accordance with the present invention however, non-quantization coding parameters such a motion vector magnitude are used by neighbor management module 218 to generate deblock strength data that adjusts the values for $\alpha$ and $\beta$ for deblocking filter module 222. For instance, when the motion vector magnitude indicates large motion vectors, e.g. magnitudes above a first magnitude threshold, a larger value of $\alpha$ can be selected. Further, motion vector magnitude indicates small motion vectors, e.g. magnitudes below the same or other threshold, a smaller value of $\alpha$ can be selected.

Figure 10:
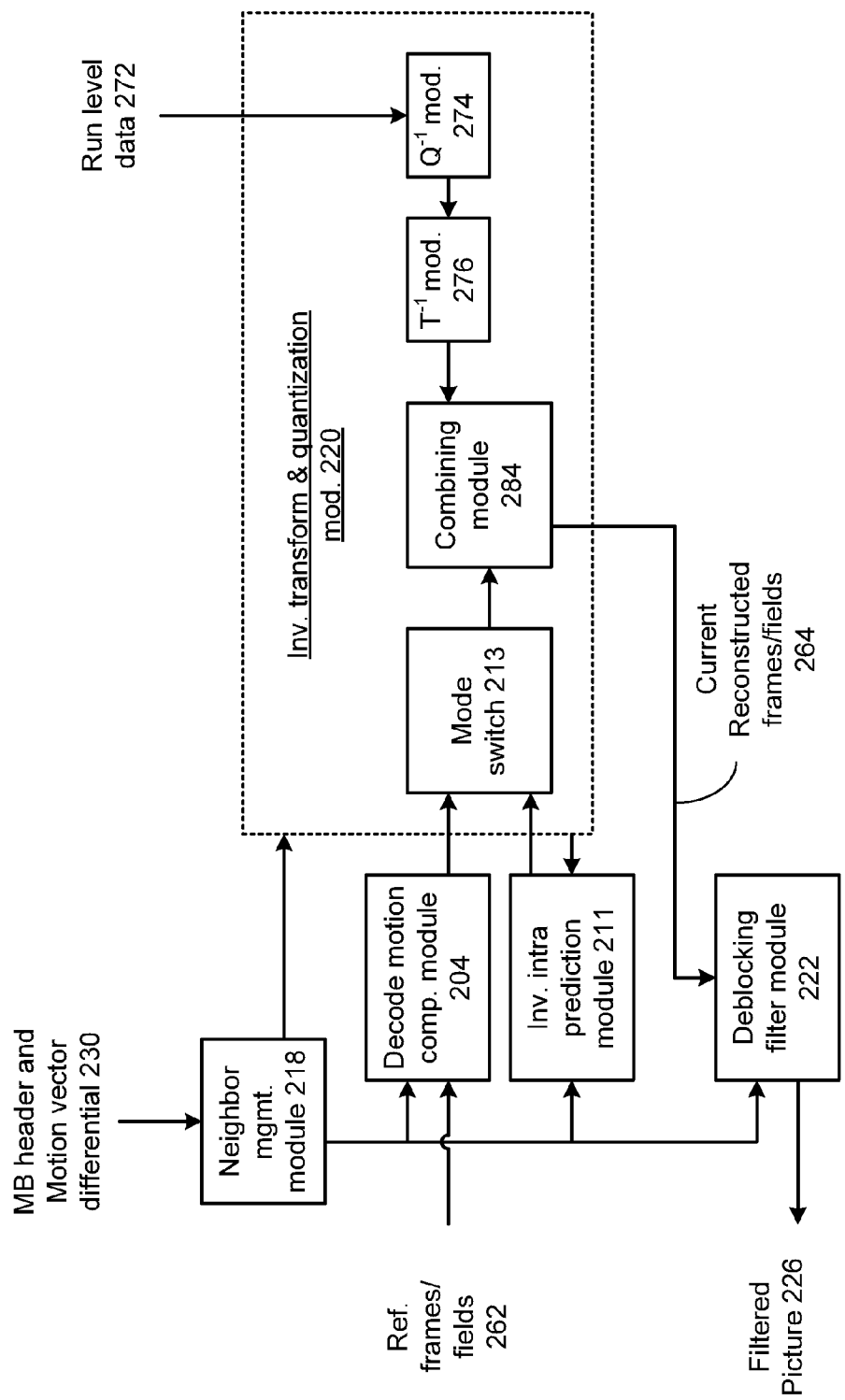
FIG. 10 presents a block diagram representation of a decoding process in accordance with an embodiment of the present invention.

FIG. 10 presents a block diagram representation of a decoding process in accordance with an embodiment of the present invention. In this embodiment, the Neighbor management module 218 receives macroblock header and motion vector differential data 230 from the EDC data 146. The neighbor management module 218 checks the macroblock (MB) mode from the MB header. In inter-prediction mode, the neighbor management module 218 calculates motion vectors, passes the motion vectors to the decode motion compensation module 204 and triggers the decode motion compensation module 204 to generate inter-prediction data based on reference frames 262 retrieved via a frame buffer of memory 154. In intra-prediction mode, the neighbor management module 218 triggers the inverse intra prediction module 211 to generate intra-prediction data based on data from the inverse quantization and transform module 220. Neighbor management module 218 also calculates deblock strength data that is passed to deblocking filter module 222.

The inverse transform and quantization module 220 inverse quantizes and inverse transforms run level data 272 from EDC data 146, via inverse quantization module 274 and inverse transform module 276, to generate residual data. The residual data is combined, via combination module 284, with either intra-prediction data or intra-prediction data supplied by mode switch 213 in response to the mode determination by neighbor management module 218, to generate current reconstructed frames/fields 264 that are buffered in the frame buffer.

Deblocking filter module 222 applies deblocking filtering in accordance with the deblock strength data from neighbor management module 218 to generate decoded video output in the form of filtered pictures 226.

Figure 11:
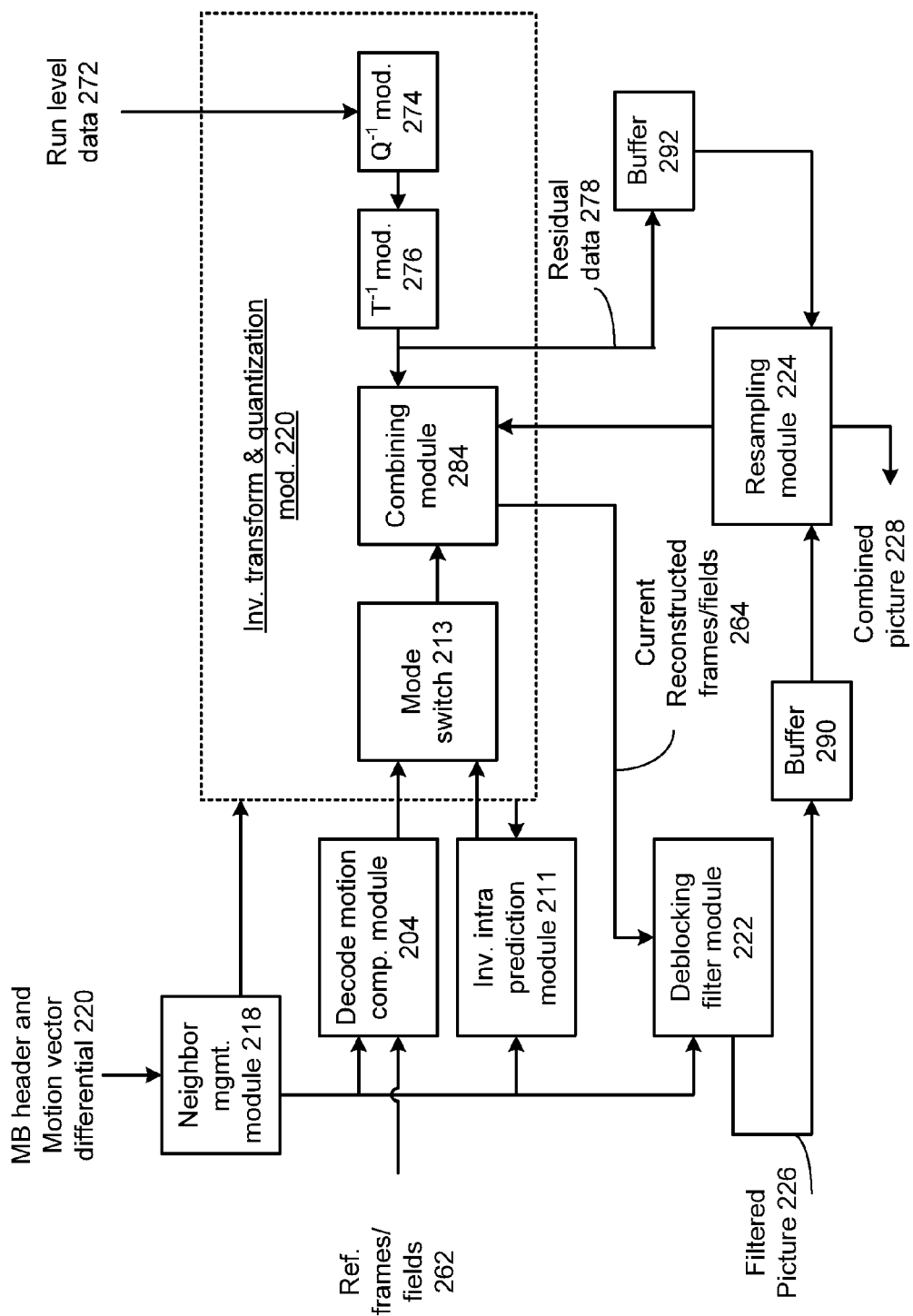
FIG. 11 presents a block diagram representation of a decoding process in accordance with another embodiment of the present invention.

FIG. 11 presents a block diagram representation of a decoding process in accordance with another embodiment of the present invention. In this embodiment, however the encoded video signal includes a plurality of video layers and the EDC data 146 further includes slice header data corresponding to the plurality of video layers being processed. As discussed in conjunction with FIGS. 7 and 8, the processing of a target layer can include processing of layer data for the target layer and dependent layers, but can exclude processing of other layers that the target layer does not depend on, either directly or indirectly. Optional resampling module 224 is included to receive the residual data 278 via buffer 292 from inverse transform and quantization module 220, and to generate the resampled residual data based on the residual data that is passed back to inverse transform and quantization module 220 to be used to generate the current reconstructed frames/fields 264. The resampling module 224 further generates the decoded video signal, as a combined picture 228 based on the filtered picture data 226 from deblocking filter module 222 via buffer 290. Buffers 290 and 292 can be implemented via a frame buffer or other buffer.

In operation, the resampling module can upscale buffered filtered pictures 226 and residual data 278 for dependent layers for combination with higher layers such as the target layer. In an embodiment of the present invention, the resampling module 224 generates the resampled residual data based on a difference in resolution between the current layer and a target layer of the plurality of layers of the encoded video signal. In particular, the resampling module 224 upscales the residual data 278 to generate the resampled residual data at a resolution of the target layer. In addition, the resampling module 224 generates resampled filtered picture data from the filtered picture data 226 by upscaling the filtered picture data from the resolution of the current layer to the resolution of the target layer. Further the resampling module 224 generates a combined picture 228 of the decoded video signal by combining filtered picture data 226 of the target layer with resampled filtered picture data of each of the dependent layers of the encoded video signal.

In an example of operation, the encoded video signal includes two layers, a base layer and an enhancement layer. In this example, the video decoder 102 selects the target layer as the enhancement layer for higher resolution output. When processing the base layer of a picture, residual data 278 for the base layer is buffered in buffer 292. The reconstructed picture for the base layer is generated by inverse transform and quantization module 220 based on the base layer residual data. This reconstructed base layer picture is filtered via deblocking filter 222 to produce a filtered base layer picture that is buffered via buffer 290.

When the enhancement layer is processed, the resampling module 224 retrieves the base layer residual data from the buffer 292 and generates upscaled residual data for the base layer that is passed to the combining module 284. The reconstructed picture for the enhancement layer is generated by inverse transform and quantization module 220 based on the upscaled base layer residual data and the enhancement layer residual data. The reconstructed enhancement layer picture is filtered via deblocking filter 222 to produce a filtered enhancement layer picture 226 that is buffered via buffer 290. The resampling module 224 upscales the filtered base layer picture and combines it with the filtered enhancement layer picture to generate the combined picture 228.

Figure 12:
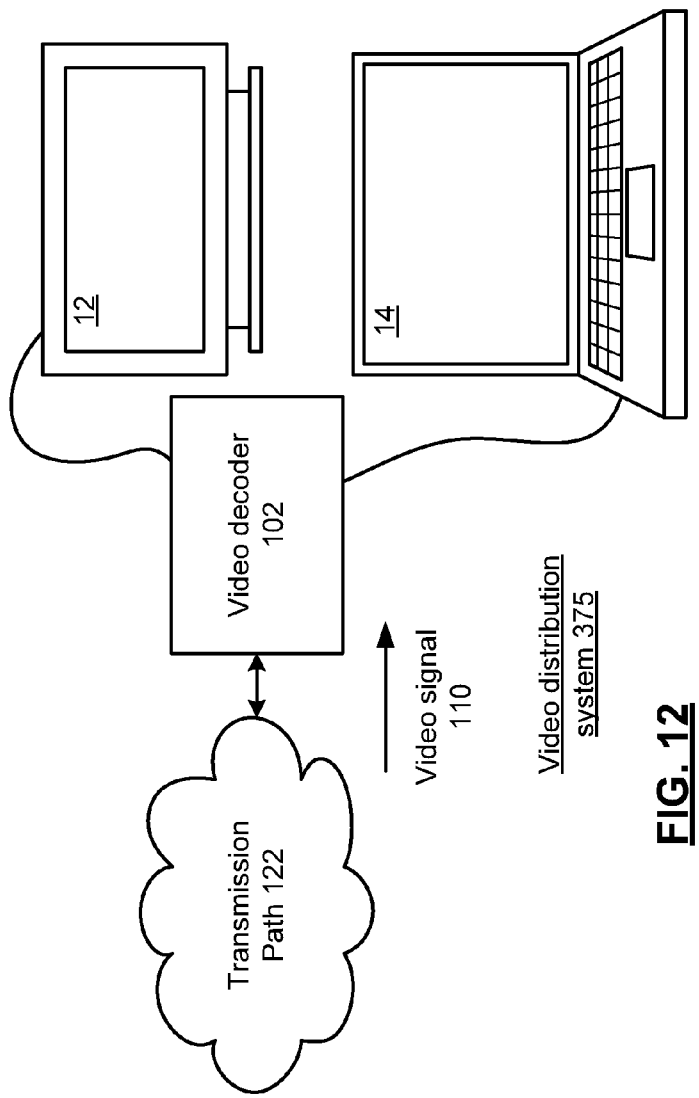
FIG. 12 presents a block diagram representation of a video distribution system 375 in accordance with an embodiment of the present invention.

FIG. 12 presents a block diagram representation of a video distribution system 375 in accordance with an embodiment of the present invention. In particular, video signal 110 is transmitted from a video encoder via a transmission path 122 to a video decoder 102. The video decoder 102 operates to decode the video signal 110 for display on a display devices 12 or 14 or other display device. In an embodiment of the present invention, video decoder 102 can be implemented in a set-top box, digital video recorder, router or home gateway. In the alternative, decoder 102 can optionally be incorporated directly in the display device 12 or 14.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 13:
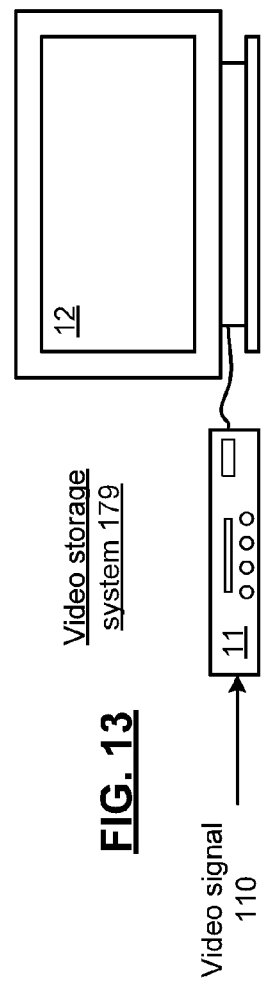
FIG. 13 presents a block diagram representation of a video storage system 179 in accordance with an embodiment of the present invention.

FIG. 13 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the video signal 110. In this configuration, device 11 can include video decoder 102 that operates to decode the video signal 110 when retrieved from storage to generate a processed video signal 112 in a format that is suitable for display by video display device 12 or 14. While these particular devices are illustrated, video storage system 179 can include a hard drive, flash memory device, computer, DVD burner, or any other device that is capable of generating, storing, decoding, transcoding and/or displaying the video content of video signal 110 in accordance with the methods and systems described in conjunction with the features and functions of the present invention as described herein.

Figure 14:
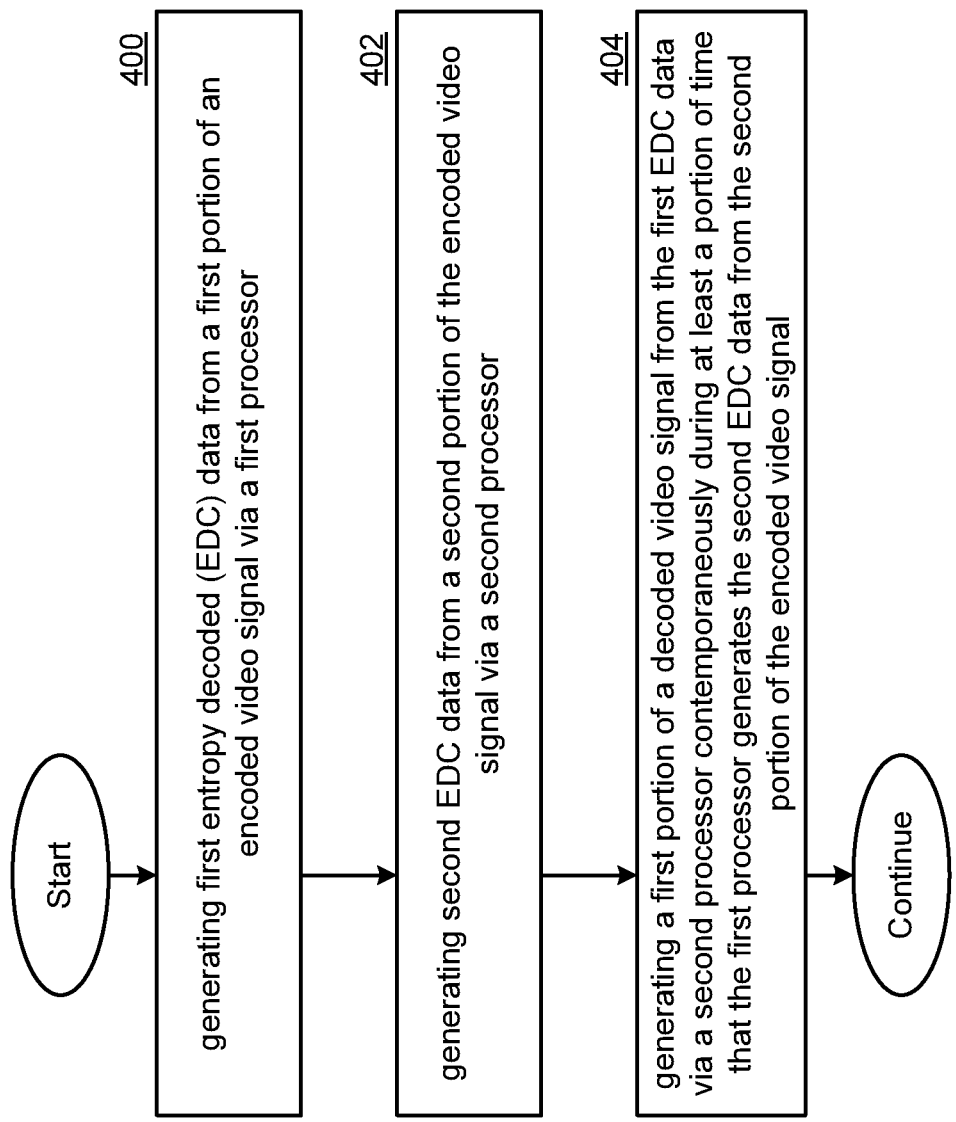
FIG. 14 presents a flow diagram representation of a method in accordance with an embodiment of the present invention.

FIG. 14 presents a block diagram representation of a method in accordance with an embodiment of the present invention. In particular, a method is presented for use in conjunction with one or more functions and features described in conjunction with FIGS. 1-9. In step 400, first entropy decoded (EDC) data is generated from a first portion of an encoded video signal via a first processor. In step 402, second EDC data is generated from a second portion of the encoded video signal via the first processor. In step 404, a first portion of a decoded video signal is generated from the first EDC data via a second processor contemporaneously during at least a portion of time that the first processor generates the second EDC data from the second portion of the encoded video signal.

In an embodiment of the present invention, the first portion of the encoded video signal corresponds to a first picture and wherein the second portion of the encoded video signal corresponds to a second picture. The second picture can be subsequent in time to the first picture in the encoded video signal. The first EDC data can include first run length data, first motion vector differential data, and first macroblock header data. The encoded video signal can include a plurality of video layers and the first EDC data includes slice header data corresponding to at least one of the plurality of video layers. The encoded video signal can be encoded in accordance with at least one of: an H.264 encoding standard, and a video coding 1 (VC-1) encoding standard.

Figure 15:
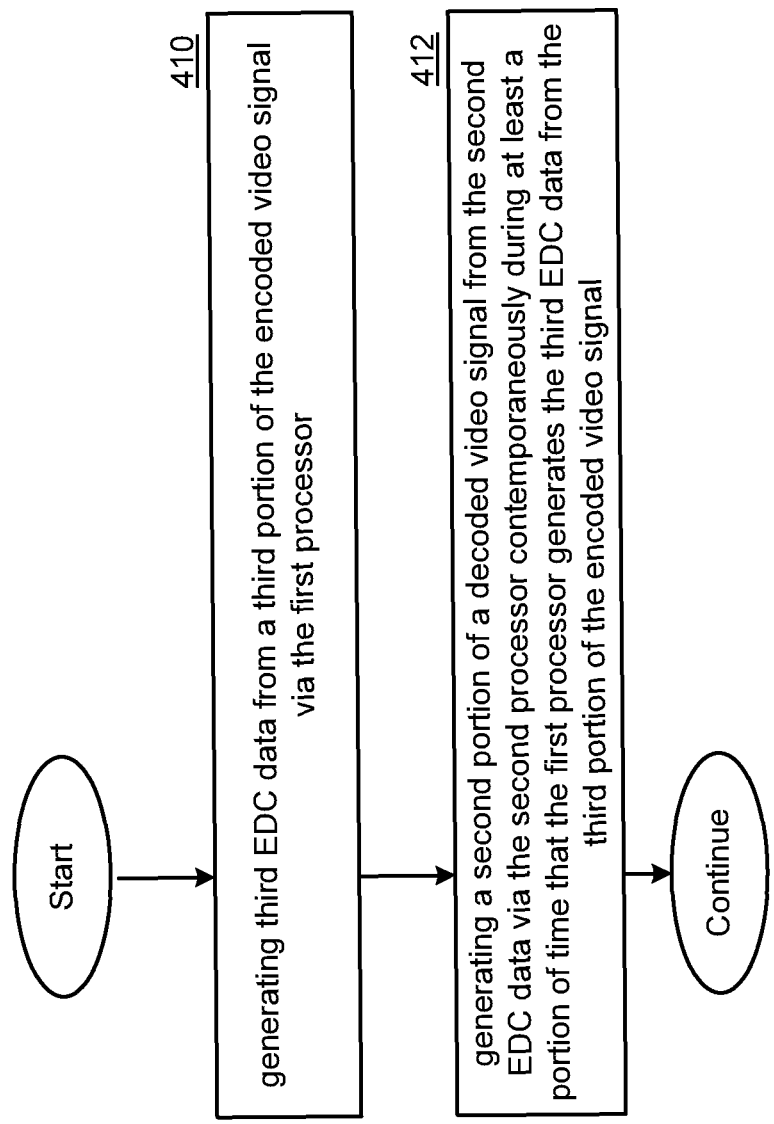
FIG. 15 presents a flow diagram representation of a method in accordance with an embodiment of the present invention.

FIG. 15 presents a block diagram representation of a method in accordance with an embodiment of the present invention. In particular, a method is presented for use in conjunction with one or more functions and features described in conjunction with FIGS. 1-10. In step 410, third EDC data is generated from a third portion of the encoded video signal via the first processor. In step 412, a second portion of a decoded video signal is generated from the second EDC data via the second processor contemporaneously during at least a portion of time that the first processor generates the third EDC data from the third portion of the encoded video signal.

Figure 16:
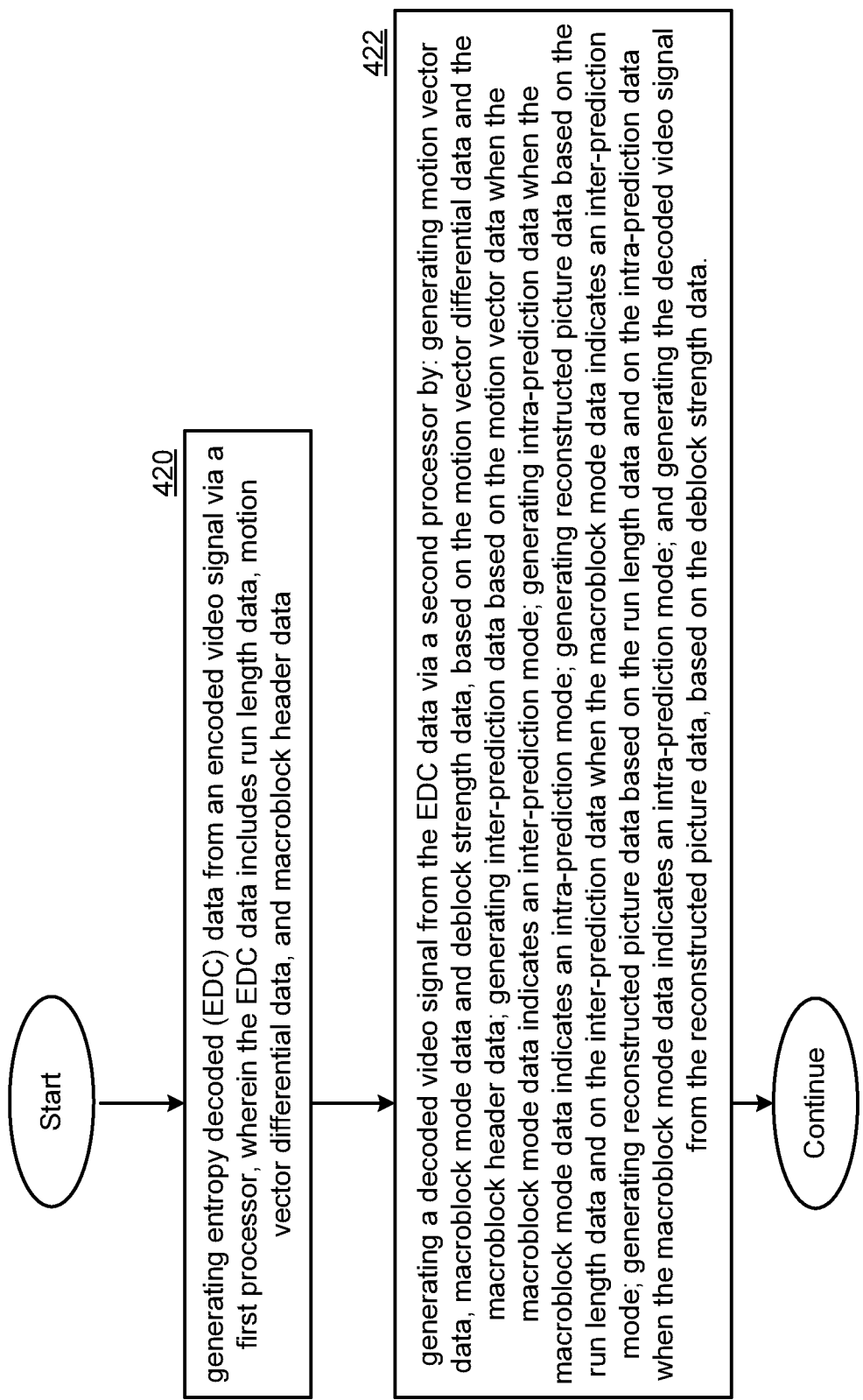
FIG. 16 presents a flow diagram representation of a method in accordance with an embodiment of the present invention.

FIG. 16 presents a block diagram representation of a method in accordance with an embodiment of the present invention. In particular, a method is presented for use in conjunction with one or more functions and features described in conjunction with FIGS. 1-9. In step 420, entropy decoded (EDC) data is generated from an encoded video signal via a first processor, wherein the EDC data includes run length data, motion vector differential data, and macroblock header data. In step 422, a decoded video signal is generated from the EDC data via a second processor by: generating motion vector data, macroblock mode data and deblock strength data, based on the motion vector differential data and the macroblock header data; generating inter-prediction data based on the motion vector data when the macroblock mode data indicates an inter-prediction mode; generating intra-prediction data when the macroblock mode data indicates an intra-prediction mode; generating reconstructed picture data based on the run length data and on the inter-prediction data when the macroblock mode data indicates an inter-prediction mode; generating reconstructed picture data based on the run length data and on the intra-prediction data when the macroblock mode data indicates an intra-prediction mode; and generating the decoded video signal from the reconstructed picture data, based on the deblock strength data.

In an embodiment of the present invention, step 422 includes generating the motion vector data for a group of macroblocks that neighbor a current macroblock, and generating the motion vector data for the current macroblock, based on both the macroblock mode data, and the motion vector data for the group of macroblocks that neighbor the current macroblock. Step 422 can also include calculating a motion vector magnitude, and adjusting the deblock strength data based on the motion vector magnitude. Step 422 can also include adjusting at least one deblock filter parameter based on the deblock strength data, and deblock filtering the reconstructed picture data based on at least one deblock filter parameter.

The encoded video signal can include a plurality of video layers and the first EDC data includes slice header data corresponding to at least one of the plurality of video layers. The encoded video signal can be encoded in accordance with at least one of an H.264 encoding standard and a video coding 1 (VC-1) encoding standard.

Figure 17:
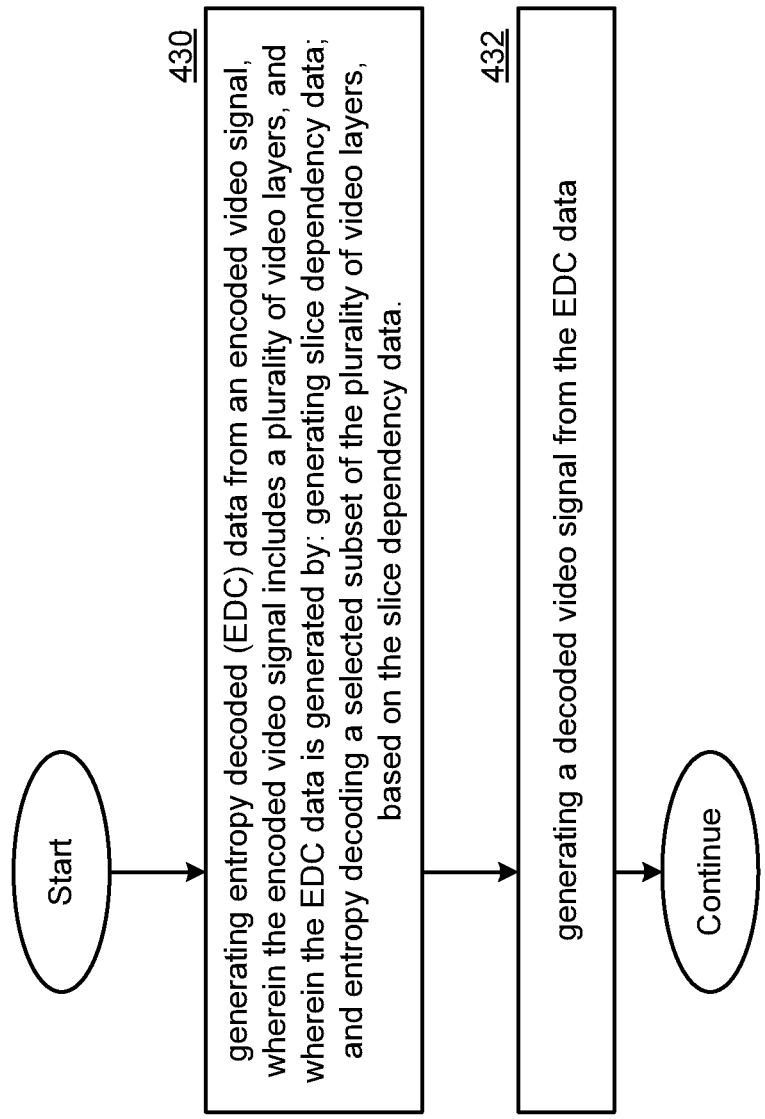
FIG. 17 presents a flow diagram representation of a method in accordance with an embodiment of the present invention.

FIG. 17 presents a block diagram representation of a method in accordance with an embodiment of the present invention. In particular, a method is presented for use in conjunction with one or more functions and features described in conjunction with FIGS. 1-9. In step 430, entropy decoded (EDC) data is generated from an encoded video signal, wherein the encoded video signal includes a plurality of video layers, and wherein the EDC data is generated by: generating slice dependency data; and entropy decoding a selected subset of the plurality of video layers, based on the slice dependency data. In step 432, a decoded video signal is generated from the EDC data.

In an embodiment of the present invention, the slice dependency data is generated by extracting dependency data from a slice header for each of the plurality of video layers. The decoded video signal can also be generated in accordance with a target layer of the plurality of video layers that is included in the selected subset of the plurality of video layers, and the slice dependency data can be generated by identifying dependent layers of the plurality of video layers that are dependent from the target layer.

The dependent layers can include each of the plurality of video layers directly dependent from the target layer, and further, each of the plurality of video layers indirectly dependent from the target layer. The selected subset of the plurality of video layers excludes each of the plurality of video layers that is not directly dependent from the target layer or indirectly dependent from the target layer.

Step 430 can include selecting an ordering of the selected subset of the plurality of video layers, wherein the selected subset of the plurality of video layers are entropy decoded in accordance with the selected ordering. The encoded video signal can be encoded in accordance with at least one of: an H.264 encoding standard and a video coding 1 (VC-1) encoding standard.

Figure 18:
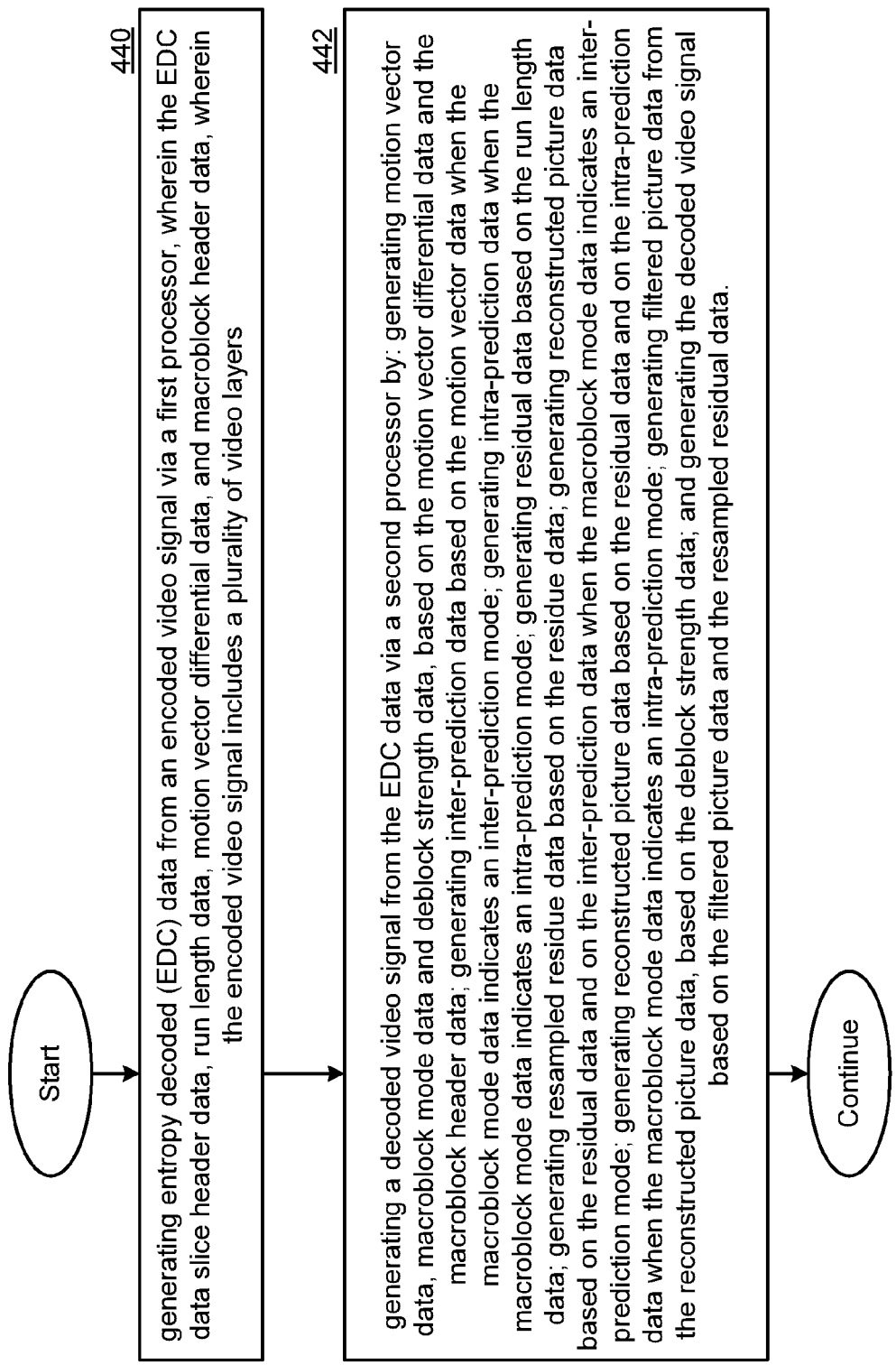
FIG. 18 presents a flow diagram representation of a method in accordance with an embodiment of the present invention.

FIG. 18 presents a block diagram representation of a method in accordance with an embodiment of the present invention. In particular, a method is presented for use in conjunction with one or more functions and features described in conjunction with FIGS. 1-9. In step 440, entropy decoded (EDC) data is generated from an encoded video signal via a first processor, wherein the EDC data slice header data, run length data, motion vector differential data, and macroblock header data, wherein the encoded video signal includes a plurality of video layers. In step 442, a decoded video signal is generated from the EDC data via a second processor by: generating motion vector data, macroblock mode data and deblock strength data, based on the motion vector differential data and the macroblock header data; generating inter-prediction data based on the motion vector data when the macroblock mode data indicates an inter-prediction mode; generating intra-prediction data when the macroblock mode data indicates an intra-prediction mode; generating residual data based on the run length data; generating resampled residual data based on the residual data and the slice header data; generating reconstructed picture data based on the resampled residual data and on the inter-prediction data when the macroblock mode data indicates an inter-prediction mode; generating reconstructed picture data based on the resampled residual data and on the intra-prediction data when the macroblock mode data indicates an intra-prediction mode; generating filtered picture data from the reconstructed picture data, based on the deblock strength data; and generating the decoded video signal based on the filtered picture data and the slice header data.

Step 432 can include analyzing the slice header data to determine a current layer of the plurality of layers; and generating the resampled residual data based on a difference in resolution between the current layer and a target layer of the plurality of layers. Step 432 can also include upscaling the residual data to generate the resampled residual data at a resolution of the target layer. Step 432 can include analyzing the slice header data to determine a current layer of the plurality of layers; and generating resampled filtered picture data from the filtered picture data, based on a difference in resolution between the current layer and a target layer of the plurality of layers.

Step 432 can include upscaling the filtered picture data to generate the resampled filtered picture data at a resolution of the target layer and generating a picture of the decoded video signal by combining resampled filtered picture data of at least one layer of the plurality of layers with filtered picture data of the target layer.

The encoded video signal can be encoded in accordance with at least one of: an H.264 encoding standard and a video coding 1 (VC-1) encoding standard.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video decoder. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video decoder comprising:
  an entropy decoding device that includes a first processor that generates entropy decoded (EDC) data from an encoded video signal that includes slice header data, run length data, motion vector differential data, and macroblock header data, wherein the encoded video signal includes a plurality of video layers;
  a general video decoding device, coupled to the entropy decoding device, that includes a second processor that generates a decoded video signal from the EDC data, wherein the general video decoding device includes:
    a decode motion compensation module;
    an intra-prediction module;
    a neighbor management module that receives the macroblock header data and the motion vector differential data for a current macroblock, generates deblock strength data, and determines macroblock mode data for the current macroblock from the macroblock header data; and
      when the macroblock mode data indicates an inter-prediction mode, calculates motion vector data and a motion vector magnitude, stores the motion vector data for a group of macroblocks that neighbor the current macroblock, passes the motion vector data to the decode motion compensation module and triggers the decode motion compensation module to generate inter-prediction data based on reference frames retrieved via a frame buffer; and
      when the macroblock mode data indicates an intra-prediction mode, the neighbor management module triggers the inverse intra-prediction module to generate intra-prediction data;
    an inverse transform/quantization module, coupled to the neighbor management module, the decode motion compensation module and the inverse intra-prediction module, that generates residual data based on the run length data and that generates reconstructed picture data based on the residual data and on the inter-prediction data when the macroblock mode data indicates the inter-prediction mode and based on the residual data and on the intra-prediction data when the macroblock mode data indicates the intra-prediction mode;
    a deblocking filter module, coupled to the inverse transform/quantization module and directly coupled to the neighbor management module, that generates filtered picture data from the reconstructed picture data, based on the deblock strength data from the neighbor management module; and
    a resampling module, coupled to the deblocking filter module and the inverse transform/quantization module, that generates resampled residual data based on the residual data, and that generates the decoded video signal based on the filtered picture data and on the resampled residual data.

2. The video decoder of claim 1 wherein the resampling module generates the resampled residual data based on a difference in resolution between a current layer and a target layer of the plurality of video layers.

3. The video decoder of claim 2 wherein the resampling module upscales the residual data to generate the resampled residual data at a resolution of the target layer.

4. The video decoder of claim 1 wherein the resampling module generates resampled filtered picture data from the filtered picture data, based on a difference in resolution between the current layer and a target layer of the plurality of layers.

5. The video decoder of claim 4 wherein the resampling module upscales the filtered picture data to generate the resampled filtered picture data at a resolution of the target layer.

6. The video decoder of claim 5 wherein the resampling module generates a picture of the decoded video signal by combining the resampled filtered picture data of at least one layer of the plurality of layers with the filtered picture data of the target layer.

7. The video decoder of claim 1 wherein the encoded video signal is encoded in accordance with at least one of: an H.264 encoding standard and a video coding 1 (VC-1) encoding standard.

8. A method comprising:
  generating entropy decoded (EDC) data from an encoded video signal via a first processor, wherein the EDC data includes slice header data, run length data, motion vector differential data, and macroblock header data, wherein the encoded video signal includes a plurality of video layers;
  generating a decoded video signal from the EDC data via a second processor by:
    generating, via a neighbor management module, motion vector data, macroblock mode data and deblock strength data for a current macroblock having neighboring macroblocks that are adjacent to the current macroblock, from the motion vector differential data and the macroblock header data for the current macroblock and the neighboring macroblocks;
    generating inter-prediction data based on the motion vector data when the macroblock mode data indicates an inter-prediction mode;
    generating intra-prediction data when the macroblock mode data indicates an intra-prediction mode;
    generating residual data based on the run length data;
    generating resampled residual data based on the residual data;
    generating reconstructed picture data based on the residual data and on the inter-prediction data when the macroblock mode data indicates the inter-prediction mode;
    generating the reconstructed picture data based on the residual data and on the intra-prediction data when the macroblock mode data indicates the intra-prediction mode;
    generating filtered picture data from the reconstructed picture data, based on the deblock strength data via a deblocking filter directly coupled to the neighbor management module; and
    generating the decoded video signal based on the filtered picture data and the resampled residual data.

9. The method of claim 8 wherein generating the resampled residual data includes:

generating the resampled residual data based on a difference in resolution between a current layer and a target layer of the plurality of video layers.

10. The method of claim 9 wherein generating the resampled residual data further includes upscaling the residual data to generate the resampled residual data at a resolution of the target layer.

11. The method of claim 8 wherein generating the decoded video signal includes:
generating resampled filtered picture data from the filtered picture data, based on a difference in resolution between a current layer and a target layer of the plurality of layers.

12. The method of claim 11 wherein generating the decoded video signal further includes:
upscaling the filtered picture data to generate the resampled filtered picture data at a resolution of the target layer.

13. The method of claim 12 wherein generating the decoded video signal further includes:
generating a picture of the decoded video signal by combining the resampled filtered picture data of at least one layer of the plurality of layers with the filtered picture data of the target layer.

14. The method of claim 8 wherein the encoded video signal is encoded in accordance with at least one of: an H.264 encoding standard and a video coding 1 (VC-1) encoding standard.

* * * * *